US009117218B2

(12) United States Patent
Loughery, III et al.

(10) Patent No.: US 9,117,218 B2
(45) Date of Patent: Aug. 25, 2015

(54) SYSTEM AND METHOD FOR EFFECTIVELY PERFORMING A DISTRIBUTION PROCEDURE USING AN ELECTRONIC BACKBONE

(75) Inventors: Donald L. Loughery, III, Long Beach, CA (US); Milton Frazier, San Marcos, CA (US); Austin Noronha, Sunnyvale, CA (US); Tim Smith, Carlsbad, CA (US); Stephen Jacobs, Ardsley, NY (US); Rajiv Rainier, San Diego, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 1700 days.

(21) Appl. No.: 12/288,833

(22) Filed: Oct. 23, 2008

(65) Prior Publication Data

US 2010/0106563 A1    Apr. 29, 2010

(51) Int. Cl.
*G06Q 30/00* (2012.01)
*G06Q 30/02* (2012.01)

(52) U.S. Cl.
CPC ............ *G06Q 30/02* (2013.01); *G06Q 30/0251* (2013.01); *G06Q 30/0254* (2013.01); *G06Q 30/0275* (2013.01)

(58) Field of Classification Search
CPC .......... G06Q 30/0241; G06Q 30/0255; G06Q 30/0251; G06Q 30/0257; G06Q 30/0269; G06Q 30/0273; G06Q 30/0274
USPC ......................................................... 705/14
See application file for complete search history.

(56) References Cited

U.S. PATENT DOCUMENTS

| | | | |
|---|---|---|---|
| 5,717,923 A | 2/1998 | Dedrick | |
| 5,933,811 A | 8/1999 | Angles et al. | |
| 6,385,592 B1 * | 5/2002 | Angles et al. | 705/14.56 |
| 2002/0169777 A1 * | 11/2002 | Balajel et al. | 707/10 |
| 2003/0158789 A1 | 8/2003 | Miura et al. | |
| 2007/0088603 A1 * | 4/2007 | Jouppi et al. | 705/14 |
| 2007/0239874 A1 * | 10/2007 | Lazaridis et al. | 709/226 |
| 2008/0109306 A1 | 5/2008 | Maigret et al. | |

FOREIGN PATENT DOCUMENTS

| | | |
|---|---|---|
| WO | WO/02/05557 | 1/2002 |
| WO | WO/02/056210 | 7/2002 |

OTHER PUBLICATIONS

Sue Mazingo. Digital Systems Report. Carlsbad: Summer 1999. vol. 21, Iss. 2; p. 27 (3 pages).*

* cited by examiner

*Primary Examiner* — John G Weiss
*Assistant Examiner* — Vincent Cao
(74) *Attorney, Agent, or Firm* — Sony Corporation (57) ABSTRACT

A system and method for effectively performing an information distribution procedure includes user devices that perform registration procedures for receiving distribution services from a distribution system. The user devices are also used to generate user metadata regarding respective device users of the user devices. A plurality of workstations are associated in the distribution system with respective advertisers. The workstations analyze the user metadata to produce corresponding bid metadata. A bid server then evaluates the bid metadata to determine one or more winning workstations from among the original workstations. The one or more winning workstations automatically transmit their advertising information to appropriate ones of the user devices. Relevant advertising information is therefore specifically targeted toward individual device users by analyzing the user metadata.

16 Claims, 12 Drawing Sheets

SYSTEM AND METHOD FOR EFFECTIVELY PERFORMING A DISTRIBUTION PROCEDURE USING AN ELECTRONIC BACKBONE

BACKGROUND SECTION

1. Field of the Invention

This invention relates generally to techniques for distributing electronic information, and relates more particularly to a system and method for effectively performing a distribution procedure using an electronic backbone.

2. Description of the Background Art

Implementing effective methods for distributing electronic data is a significant consideration for designers and manufacturers of contemporary electronic systems. However, effectively distributing electronic data utilized by electronic devices may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced system capability to perform various advanced data distribution operations may provide additional benefits to a system user, but may also place increased demands on the control and management of various system components. For example, an electronic system that effectively manages electronic advertising information may benefit from an effective implementation because of the large amount and complexity of the digital data involved.

Due to growing demands on system resources and substantially increasing data magnitudes, it is apparent that developing new techniques for distributing electronic data to electronic devices is a matter of concern for related electronic technologies. Therefore, for all the foregoing reasons, developing effective techniques for distributing electronic data remains a significant consideration for designers, manufacturers, and users of contemporary electronic devices.

SUMMARY

In accordance with the present invention, a distribution system for effectively performing an information distribution procedure is disclosed. In one embodiment, the distribution system automatically provides various types of appropriate information for utilization by device users of corresponding user devices. For example, the distributed information may include, but is not limited to, commercial advertising information that is targeted towards specific device users. Unlike traditional advertising techniques that support a "pull" model that requires consumers to actively access desired advertising information, the foregoing distribution system supports a "push" model that automatically selects and transmits appropriate advertising information to targeted device users based upon corresponding metadata files that define both the device users and the various advertisers.

In one embodiment of the distribution system, user devices initially subscribe for the distribution services by communicating with a registration server via any appropriate means. During the registration procedure, device users enter an agreement to allow the distribution system to collect and utilize certain specified user information that depends upon what level of privacy is preferred by the individual device users. The user devices utilize a backbone library to create user metadata that defines user characteristics by utilizing a format and nomenclature that is consistent throughout the distribution system. Similarly, advertisers utilize respective advertiser workstations to create advertiser metadata that defines respective advertiser and product characteristics.

A metadata server may then evaluate and combine the user metadata and the advertiser metadata into combined metadata files. The metadata server may also periodically update the metadata file to reflect current conditions or the occurrence of new events with respect to the device users or advertisers. The various advertiser workstations may then access and analyze the metadata files to create corresponding bid metadata that reflect specific advertising bids from the various advertisers. The advertiser workstations then send their bid metadata to a bid server in the distribution system.

The bid server analyzes the respective bid metadata from the various advertiser workstations according to predefined bidding criteria to generate bid results that indicate one or more "winning" advertisers. The predefined bidding criteria may comprise any appropriate information, including, but not limited to, the relevance of advertised product(s) to specific device users, the amount of the bids offered by advertisers, and the relative cost of the advertised product(s).

The bid server sends the bid results to the advertiser workstations. In response, the winning advertiser(s) send advertising information to an ad server. Upon receiving the advertisements from the advertiser workstations, the ad server automatically pushes/transmits the advertisements to the appropriate targeted user device(s) by utilizing any appropriate means. Finally, the user device(s) may display the pushed ads to corresponding device users in any appropriate manner. For at least the foregoing reasons, the present invention therefore provides an improved system and method for effectively performing a distribution procedure using an electronic backbone.

DETAILED DESCRIPTION

The present invention relates to an improvement in electronic data distribution techniques. The following description is presented to enable one of ordinary skill in the art to make and use the invention, and is provided in the context of a patent application and its requirements. Various modifications to the disclosed embodiments will be apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for effectively performing an information distribution procedure, and includes user devices that perform registration procedures for receiving distribution services from a distribution system. The user devices are also used to generate user metadata regarding respective device users of the user devices. A plurality of workstations are associated in the distribution system with respective advertisers. The workstations analyze the user metadata to produce corresponding bid metadata. A bid server then evaluates the bid metadata to determine one or more winning workstations from among the original workstations. The one or more winning workstations automatically transmit their advertising information to appropriate ones of the user devices. Relevant advertising information is therefore specifically targeted toward individual device users by analyzing the user metadata.

Figure 1:
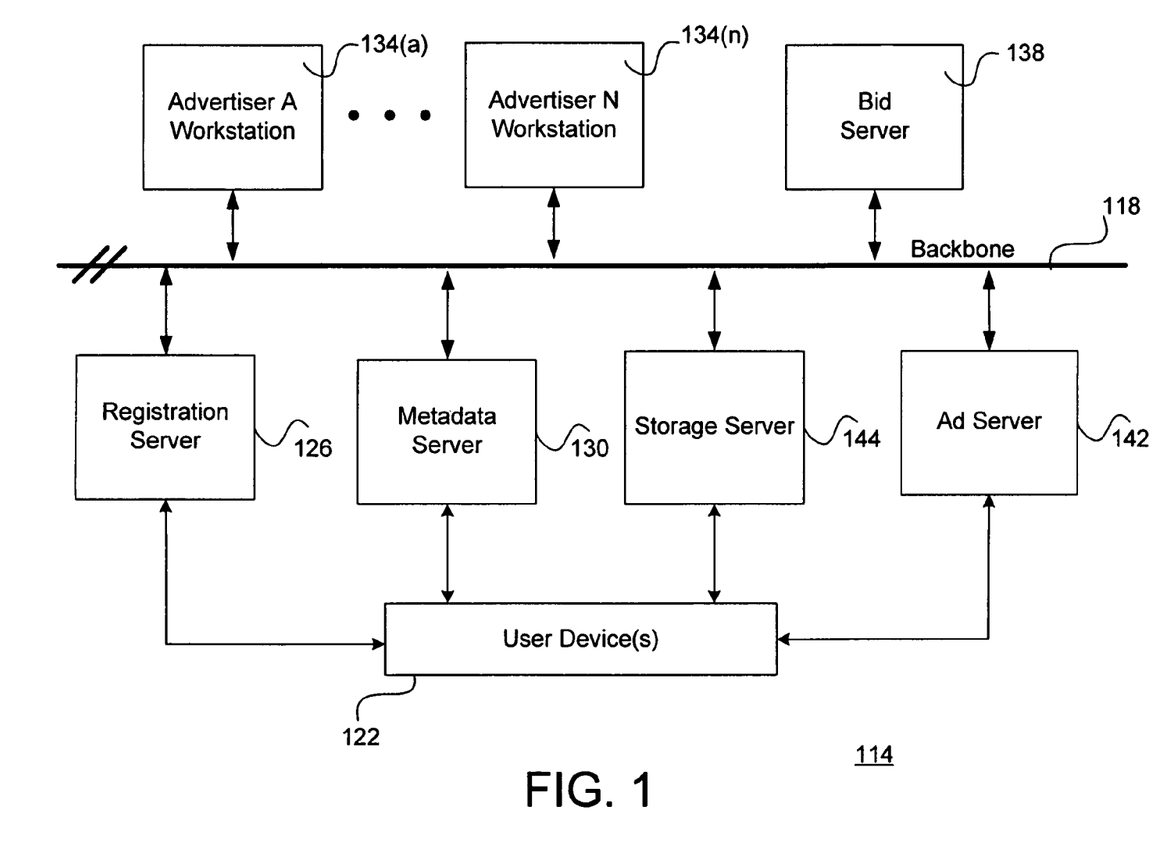
FIG. 1 is a block diagram of a distribution system, in accordance with one embodiment of the present invention.

Referring now to FIG. 1, a block diagram of a distribution system 114 is shown, in accordance with one embodiment of the present invention. In the FIG. 1 embodiment, distribution system 114 may include, but is not limited to, one or more user devices 122, a registration server 126, a metadata server 130, one or more advertiser workstations 134, a bid server 138, an ad server 142, and a storage server 144. In the FIG. 1 embodiment, certain elements of distribution system 114 communicate through an electronic backbone 118.

In alternate embodiments, distribution system 114 may be implemented by utilizing components and configurations in addition to, or instead of, certain of those components and configurations discussed in conjunction with the FIG. 1 embodiment. For example, in certain embodiments, some or all of the servers shown in the FIG. 1 embodiment may be implemented as respective banks of similar servers in order to accommodate a greater amount of data transmission and data processing by distribution system 114.

In accordance with the present invention, distribution system 114 advantageously supports a distribution procedure that automatically provides various types of appropriate information for utilization by device users of corresponding user devices 122. For example, the distributed information may include, but is not limited to, commercial advertising information that is specifically targeted towards appropriate device users of user devices 122. Unlike traditional advertising techniques that support a "pull" model that requires consumers to actively access desired advertising information, the FIG. 1 distribution system 114 supports a "push" model that automatically selects and transmits appropriate advertising information to targeted device users based upon corresponding metadata that defines both the device users and the various advertisers.

In the FIG. 1 embodiment, distribution system 114 may be implemented and supported by a distribution control entity that offers distribution services to both advertisers and device users in return for financial or other compensation. The distribution control entity may be a commercial enterprise that maintains and controls key elements of distribution system 114 such as registration server 126, metadata server 130, bid server 138, ad server 142, and storage server 144. The distribution control entity thus effectively controls access by both advertisers and device users to distribution system 114.

In the FIG. 1 embodiment, certain elements of distribution system 114 communicate through an electronic backbone 118 that may be implemented in any effective manner. For example, backbone 118 may be implemented as one or more system busses or electronic pipelines that support communications through distribution system 114 by utilizing any appropriate hard-wired or wireless techniques. In addition, in certain embodiments, backbone 118 may be implemented by concurrently utilizing a plurality of different types of electronic communication methods.

During typical operation of the FIG. 1 distribution system 114, user devices 122 initially subscribe for distribution services from distribution system 114 by communicating with registration server 126 via any appropriate means. During the registration procedure, device users enter an agreement to allow distribution system 114 to collect and utilize certain specified user information that depends upon what level of privacy is preferred by the individual device users. The user devices 122 utilize a backbone library to create user metadata that defines the respective user information by utilizing a format and nomenclature that is consistent throughout distribution system 114. The user devices 122 then store the user metadata onto storage server 144.

In the FIG. 1 embodiment, advertisers utilize respective advertiser workstation A ($134(a)$) through advertiser workstation N ($134(n)$) to similarly create appropriate advertiser metadata that defines advertiser information regarding the respective advertisers. In particular, advertiser workstations 134 access the backbone library via backbone 118 to create advertiser metadata that defines the respective advertiser information by utilizing a format and nomenclature that is consistent throughout distribution system 114. The advertiser workstations 134 may then store the advertiser metadata onto storage server 144 through backbone 118. In alternate embodiments, any desired number of advertiser workstations 134 may be supported by distribution system 114.

In the FIG. 1 embodiment, metadata server 130 combines the user metadata and the advertiser metadata into a combined metadata file that is typically stored on storage server 144 over backbone 118. Metadata server 130 may also periodically update the user and advertiser information in the metadata file to reflect current conditions or the occurrence of new events. In the FIG. 1 embodiment, the various advertiser workstations 134 may then access and analyze the metadata file through backbone 118 to create respective bid metadata that reflect advertising bids from the various advertisers to transmit advertising information to appropriate user devices 122. The advertiser workstations 134 then send their bid metadata to bid server 138 via backbone 118.

In the FIG. 1 embodiment, bid server 138 analyzes the respective bid metadata from the various advertiser workstations 134 according to predefined bidding criteria to generate bid results that indicate one or more "winning" advertisers. The predefined bidding criteria may comprise any appropriate information, including, but not limited to, the relevance of advertised product(s) to a specific device user, the amount of the bids offered by advertisers, and the relative cost of advertised product(s).

In the FIG. 1 embodiment, bid server 138 sends the bid results to the advertiser workstations 134 over backbone 118. In response, the winning advertiser(s) send the appropriate advertising information (ads) to ad server 142 via backbone 118. Upon receiving the advertisements from the advertiser workstations 134, bid server 138 automatically pushes/transmits the advertising to the appropriate targeted user device(s) 122 by utilizing any appropriate means. For example, in certain embodiments, user devices 122 may communicate with various servers of distribution system 114 via a distributed computer network like the Internet. Finally, the user device(s) 122 may display the pushed ads to corresponding device users in any appropriate manner. The present invention thus proves an improved system and method for performing a distribution procedure. Further details regarding the implementation and utilization of the FIG. 1 distribution system 114 are discussed below in conjunction with FIGS. 2-9.

Figure 2:
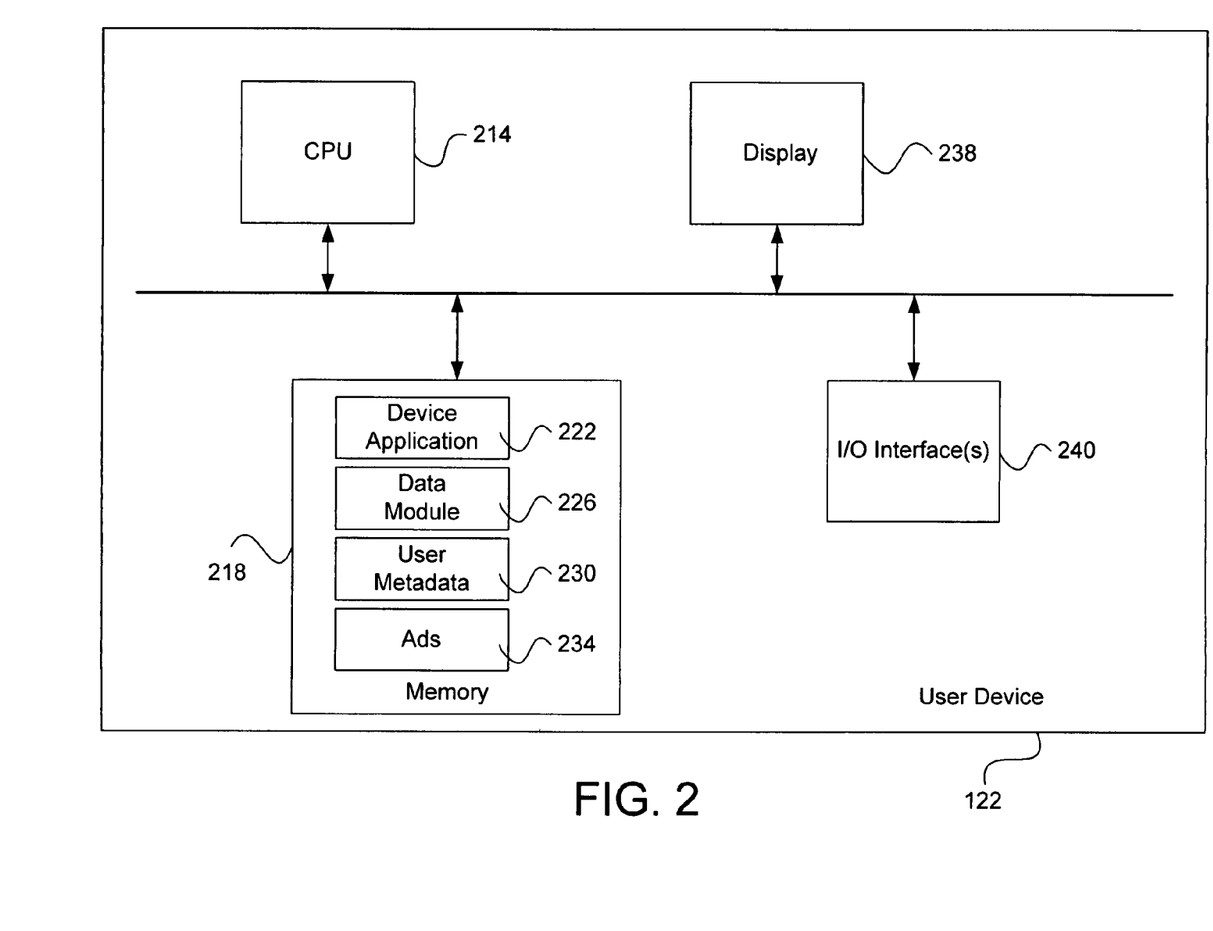
FIG. 2 is a block diagram for one embodiment of a user device from FIG. 1, in accordance with the present invention.

Referring now to FIG. 2, a block diagram for one embodiment of a FIG. 1 user device 122 is shown, in accordance with the present invention. In the FIG. 2 embodiment, user device 122 includes, but is not limited to, a central processing unit (CPU) 214, a memory 218, a display 238, and one or more input/output interface(s) (I/O interface(s)) 240. The FIG. 2 embodiment is presented for purposes of illustration, and in alternate embodiments, a user device 122 may be implemented using components and configurations in addition to, or instead of, certain of those components and configurations discussed in conjunction with the FIG. 2 embodiment. In addition, user device 122 may be implemented as any type of portable or non-portable electronic device, including, but not limited to, a desktop computer, a personal digital assistant, a cellular telephone, a settop box, or a laptop computer.

In the FIG. 2 embodiment, CPU 214 may be implemented to include any appropriate and compatible microprocessor device that preferably executes software instructions to thereby control and manage the operation of user device 122. The FIG. 2 display 238 may include any effective type of display technology including a cathode-ray-tube monitor or a liquid-crystal display device with an appropriate screen for displaying various information to a device user. In the FIG. 2 embodiment, I/O interface(s) 240 may include one or more input and/or output interfaces to receive and/or transmit any required types of information by user device 122.

In the FIG. 2 embodiment, memory 218 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 2 embodiment, memory 218 includes, but is not limited to, a device application 222, a data module 226, user metadata 230, and one or more advertisements (ads) 234.

In the FIG. 2 embodiment, device application 222 may include program instructions that are preferably executed by CPU 214 to perform various functions and operations for user device 122. The particular nature and functionality of device application 222 typically varies depending upon factors such as the specific type and particular functionality of the corresponding user device 122.

In the FIG. 2 embodiment, user device 122 utilizes data module 226 to create user metadata 230 that describes any desired attributes or characteristics related to user device 122 or a device user of user device 122. For example, user metadata 230 may include, but is not limited to, information regarding a device user's name, gender, age, religion, hobbies, interests, occupation, marital status, residence, income, Internet browsing history, and credit-card transaction records. In the FIG. 2 embodiment, ads 234 include targeted advertising information that has been received from distribution system 114 (FIG. 1) specifically for a device user of user device 122. Additional details for the utilization of user device 122 are further discussed below in conjunction with FIGS. 9A-9D.

Figure 3:
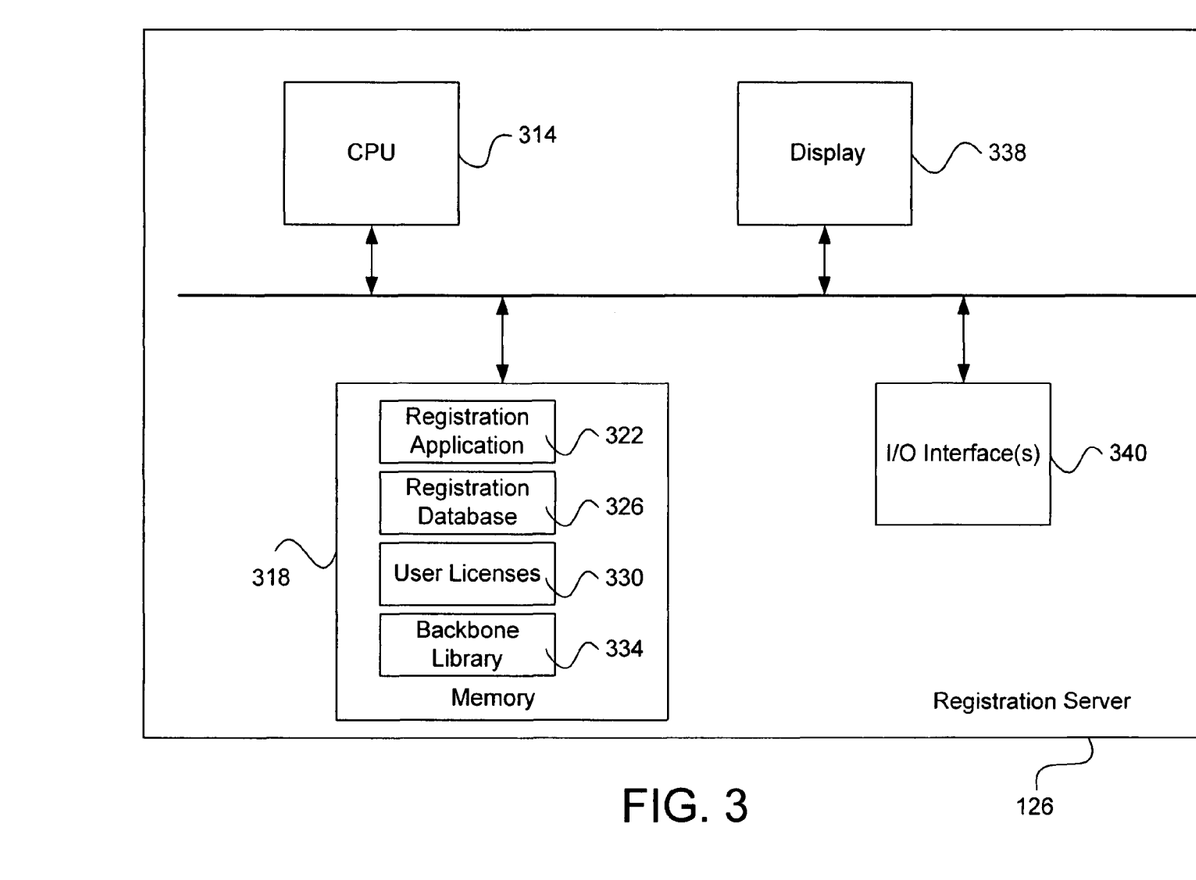
FIG. 3 is a block diagram for one embodiment of the registration server from FIG. 1, in accordance with the present invention.

Referring now to FIG. 3, a block diagram for one embodiment of the FIG. 1 registration server 126 is shown, in accordance with the present invention. In the FIG. 3 embodiment, registration server 126 includes, but is not limited to, a central processing unit (CPU) 314, a memory 318, a display 338, and one or more input/output interface(s) (I/O interface(s)) 340. The FIG. 3 embodiment is presented for purposes of illustration, and in alternate embodiments, registration server 126 may be implemented using components and configurations in addition to, or instead of, certain of those components and configurations discussed in conjunction with the FIG. 3 embodiment.

In the FIG. 3 embodiment, CPU 314 may be implemented to include any appropriate and compatible microprocessor device that preferably executes software instructions to thereby control and manage the operation of registration server 126. The FIG. 3 display 338 may include any effective type of display technology including a cathode-ray-tube monitor or a liquid-crystal display device with an appropriate screen for displaying various information to a device user. In the FIG. 3 embodiment, I/O interface(s) 340 may include one or more input and/or output interfaces to receive and/or transmit any required types of information by registration server 126.

In the FIG. 3 embodiment, memory 318 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 3 embodiment, memory 318 includes, but is not limited to, a registration application 322, a registration database 326, user licenses 330, and a backbone library 334.

In the FIG. 3 embodiment, registration application 322 may include program instructions that are preferably executed by CPU 314 to perform various functions and operations for registration server 126. For example, registration application 322 may coordinate a registration procedure to register a device user of a user device 122 (FIG. 2) to receive distribution services from distribution system 114 (FIG. 1). Registration database 326 preferably includes information regarding all device users and corresponding user devices 122 that subscribe to distribution services from distribution system 114.

In the FIG. 2 embodiment, user licenses 330 include verified agreements with registered device users to permit collection and use of corresponding user metadata 230 (FIG. 2) by distribution system 114. In the FIG. 3 embodiment, backbone library 334 includes information regarding all supported nomenclatures, formats, and taxonomies for metadata and communications in distribution system 114. A given entity in distribution system 114 may thus reference backbone library 334 to ensure that all data and communications in distribution system 114 conform to the specifications defined in backbone library 334. Additional details for the utilization of registration server 126 are further discussed below in conjunction with FIGS. 9A-9D.

Figure 4:
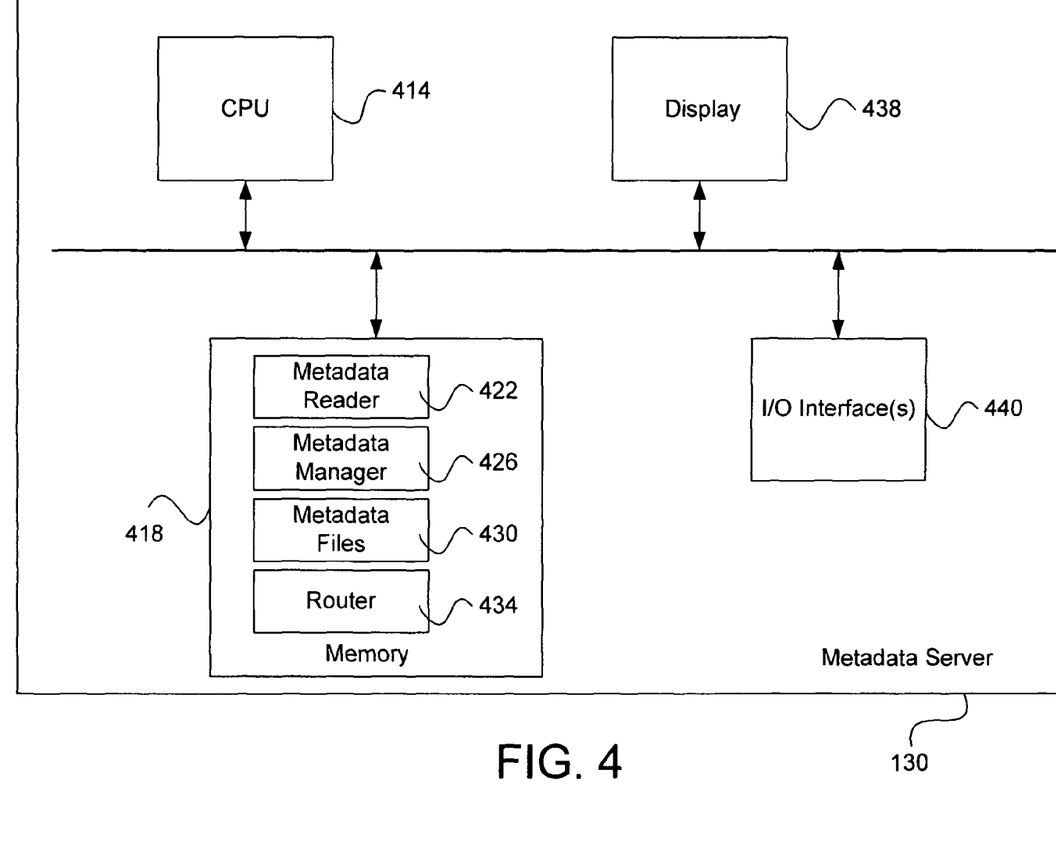
FIG. 4 is a block diagram for one embodiment of the metadata server from FIG. 1, in accordance with the present invention.

Referring now to FIG. 4, a block diagram for one embodiment of the FIG. 1 metadata server 130 is shown, in accordance with the present invention. In the FIG. 4 embodiment, metadata server 130 includes, but is not limited to, a central processing unit (CPU) 414, a memory 418, a display 438, and one or more input/output interface(s) (I/O interface(s)) 440. The FIG. 4 embodiment is presented for purposes of illustration, and in alternate embodiments, metadata server 130 may be implemented using components and configurations in addition to, or instead of, certain of those components and configurations discussed in conjunction with the FIG. 4 embodiment.

In the FIG. 4 embodiment, CPU 414 may be implemented to include any appropriate and compatible microprocessor device that preferably executes software instructions to thereby control and manage the operation of metadata server 130. The FIG. 4 display 438 may include any effective type of display technology including a cathode-ray-tube monitor or a liquid-crystal display device with an appropriate screen for displaying various information to a device user. In the FIG. 4 embodiment, I/O interface(s) 440 may include one or more input and/or output interfaces to receive and/or transmit any required types of information by metadata server 130.

In the FIG. 4 embodiment, memory 418 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 4 embodiment, memory 418 includes, but is not limited to, a metadata reader 422, a metadata manager 426, metadata files 430, and a router 434.

In the FIG. 4 embodiment, metadata server 130 may utilize metadata reader 422 to communicate with user devices 122 to create and/or update appropriate user metadata that router 434 stores into storage server 144 (FIG. 1). Similarly, metadata server 130 may utilize metadata manager 426 to communicate with advertiser workstations 134 (FIG. 1) to create and/or update appropriate advertiser metadata that router 434 stores into storage server 144. In the FIG. 4 embodiment, metadata manager 426 may then combine the user metadata and the advertiser metadata to create metadata files 430 that router 434 stores into storage server 144 via backbone 118. Additional details for the utilization of metadata server 130 are further discussed below in conjunction with FIGS. 9A-9D.

Figure 5:
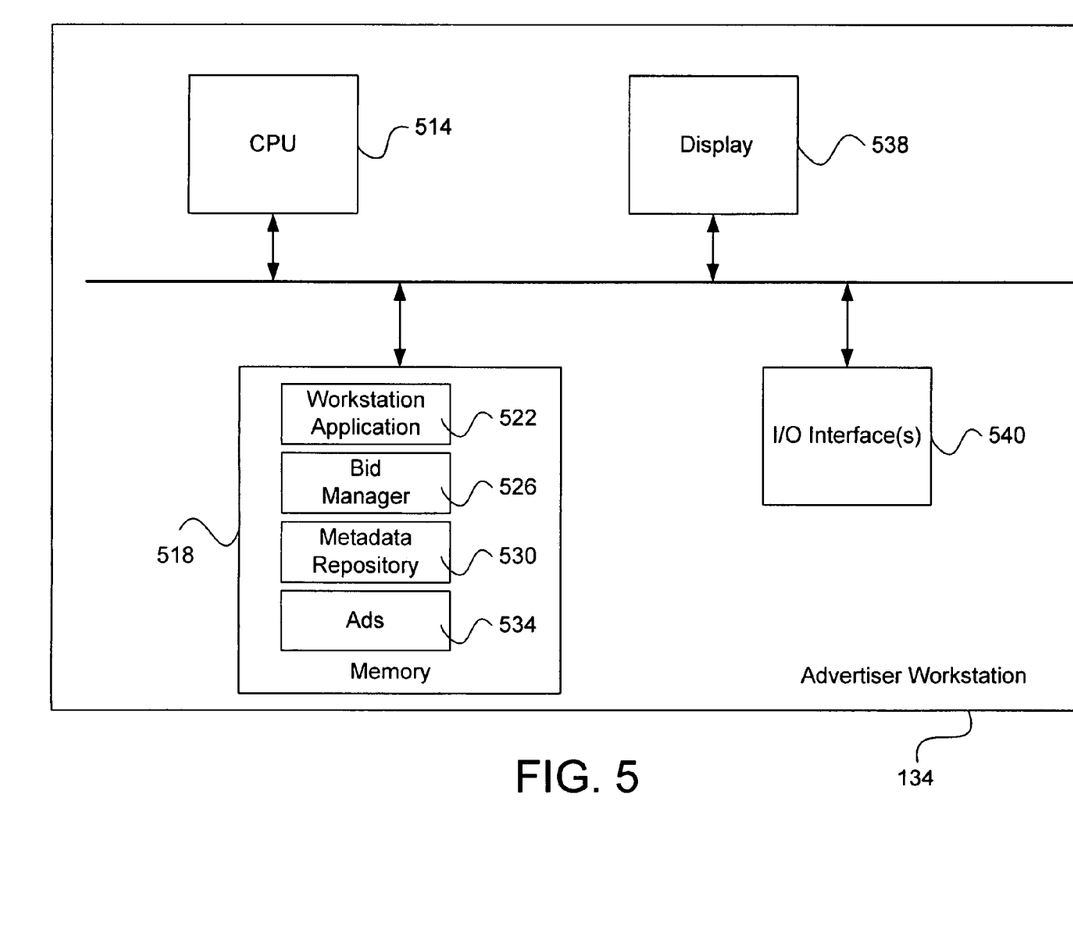
FIG. 5 is a block diagram for one embodiment of an advertiser workstation from FIG. 1, in accordance with the present invention.

Referring now to FIG. 5, a block diagram for one embodiment of a FIG. 1 advertiser workstation 134 is shown, in accordance with the present invention. In the FIG. 5 embodiment, advertiser workstation 134 includes, but is not limited to, a central processing unit (CPU) 514, a memory 518, a display 538, and one or more input/output interface(s) (I/O interface(s)) 540. The FIG. 5 embodiment is presented for purposes of illustration, and in alternate embodiments, an advertiser workstation 134 may be implemented using components and configurations in addition to, or instead of, certain of those components and configurations discussed in conjunction with the FIG. 5 embodiment.

In the FIG. 5 embodiment, CPU 514 may be implemented to include any appropriate and compatible microprocessor device that preferably executes software instructions to thereby control and manage the operation of advertiser workstation 134. The FIG. 5 display 538 may include any effective type of display technology including a cathode-ray-tube monitor or a liquid-crystal display device with an appropriate screen for displaying various information to a device user. In the FIG. 5 embodiment, I/O interface(s) 540 may include one or more input and/or output interfaces to receive and/or transmit any required types of information by advertiser workstation 134.

In the FIG. 5 embodiment, memory 518 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 5 embodiment, memory 518 includes, but is not limited to, a workstation application 522, a bid manager 526, a metadata repository 530, and one or more advertisements (ads) 534.

In the FIG. 5 embodiment, workstation application 522 may include program instructions that are preferably executed by CPU 514 to perform various functions and operations for advertiser workstation 134. The particular nature and functionality of workstation application 522 typically varies depending upon factors such as the specific type and particular functionality of the corresponding advertiser workstation 134.

In the FIG. 5 embodiment, advertiser workstation 134 may utilize bid manager 526 to access and store metadata files 430 (FIG. 4) into metadata repository 530. The metadata files 430 are typically created by metadata server 130 (FIG. 4) to include relevant information from user metadata and advertiser metadata. Bid manager 526 may then analyze the metadata files 430 in metadata repository 530 in order to create corresponding bid metadata that is sent to bid server 138 (FIG. 1) via backbone 118. In the FIG. 5 embodiment, ads 534 include advertising information corresponding to a given advertiser associated with advertiser workstation 134. Additional details for the utilization of advertiser workstation 134 are further discussed below in conjunction with FIGS. 9A-9D.

Figure 6:
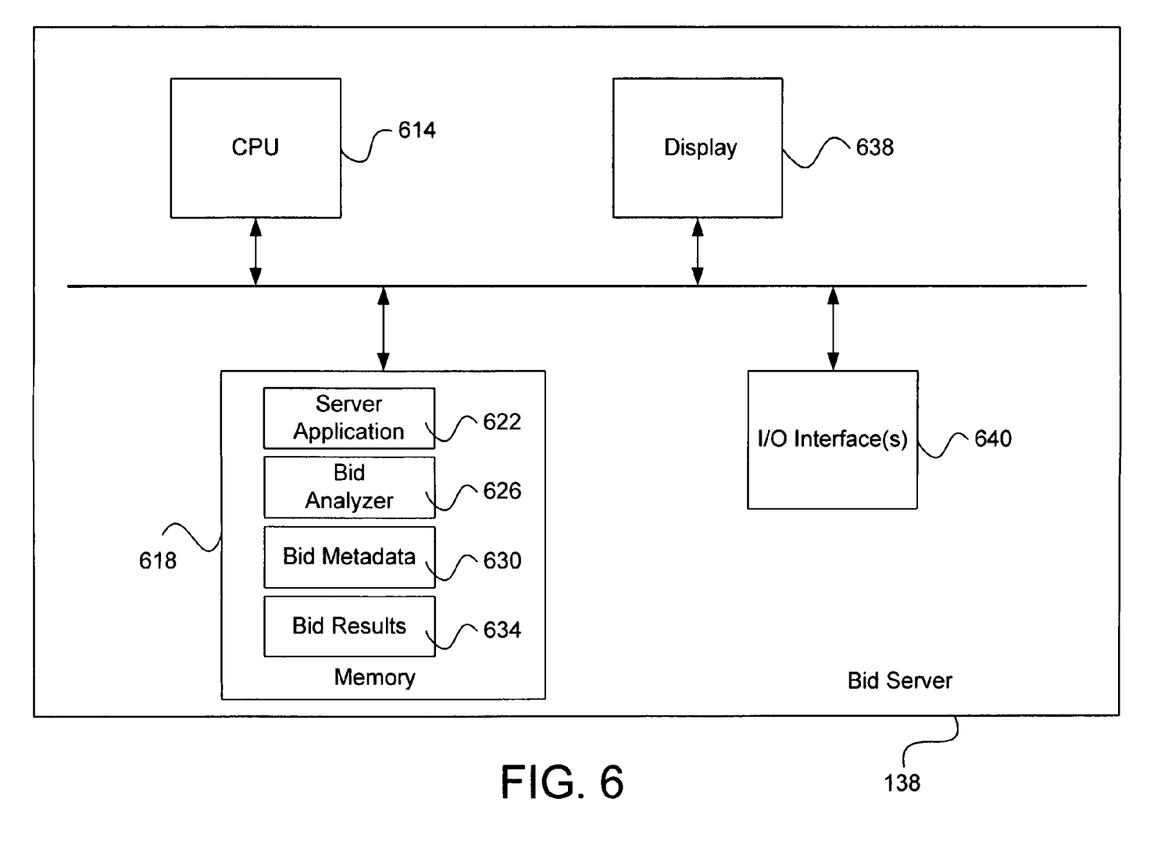
FIG. 6 is a block diagram for one embodiment of the bid server from FIG. 1, in accordance with the present invention.

Referring now to FIG. 6, a block diagram for one embodiment of the FIG. 1 bid server 138 is shown, in accordance with the present invention. In the FIG. 6 embodiment, bid server 138 includes, but is not limited to, a central processing unit (CPU) 614, a memory 618, a display 638, and one or more input/output interface(s) (I/O interface(s)) 640. The FIG. 6 embodiment is presented for purposes of illustration, and in alternate embodiments, bid server 138 may be implemented using components and configurations in addition to, or instead of, certain of those components and configurations discussed in conjunction with the FIG. 6 embodiment.

In the FIG. 6 embodiment, CPU 614 may be implemented to include any appropriate and compatible microprocessor device that preferably executes software instructions to thereby control and manage the operation of bid server 138. The FIG. 6 display 638 may include any effective type of display technology including a cathode-ray-tube monitor or a liquid-crystal display device with an appropriate screen for displaying various information to a device user. In the FIG. 6 embodiment, I/O interface(s) 640 may include one or more input and/or output interfaces to receive and/or transmit any required types of information by bid server 138.

In the FIG. 6 embodiment, memory 618 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 6 embodiment, memory 618 includes, but is not limited to, a server application 622, a bid analyzer 626, bid metadata 630, and bid results 634.

In the FIG. 6 embodiment, server application 622 may include program instructions that are preferably executed by CPU 614 to perform various functions and operations for bid server 138. The particular nature and functionality of device application 222 typically varies depending upon factors such as the specific type and particular functionality of the corresponding bid server 138.

In the FIG. 6 embodiment, bid server 138 may utilize bid analyzer 626 to analyze bid metadata 630 that is typically received from various advertiser workstations 134 (FIG. 5) to generate corresponding bid results 634. In the FIG. 6 embodiment, bid metadata 630 may include any appropriate or relevant information including, but not limited to, metadata files 430 (FIG. 4) and specific advertiser bid information (such as a payment amount for transmitting advertising information to user devices 134).

In the FIG. 6 embodiment, bid results 634 may include one or more advertisers (and associated advertiser workstations 134) that have been selected as bidding winners. Bid analyzer 626 may determine the bid results 634 in any effective manner. For example, in certain embodiments, bid analyzer 626 may select winning advertisers by evaluating predetermined bidding criteria that may include, but are not limited to, the relevance of an advertised product to a particular consumer (device user) and the bid amounts being offered by the advertisers. In certain embodiments, bidding criteria may be weighted to indicate a desired priority scheme. Additional details for the utilization of bid server 138 are further discussed below in conjunction with FIGS. 9A-9D.

Figure 7:
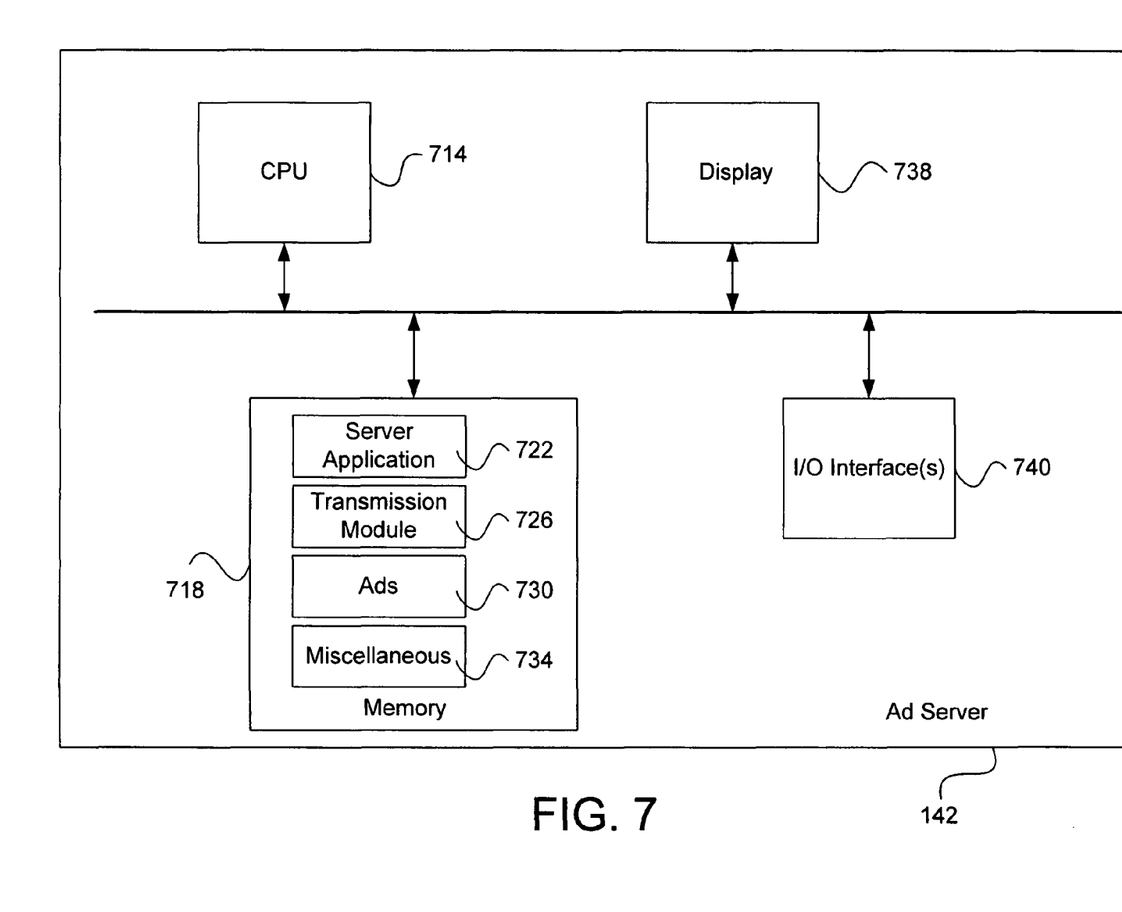
FIG. 7 is a block diagram for one embodiment of the ad server from FIG. 1, in accordance with the present invention.

Referring now to FIG. 7, a block diagram for one embodiment of the FIG. 1 ad server 142 is shown, in accordance with the present invention. In the FIG. 7 embodiment, ad server 142 includes, but is not limited to, a central processing unit (CPU) 714, a memory 718, a display 738, and one or more input/output interface(s) (I/O interface(s)) 740. The FIG. 7 embodiment is presented for purposes of illustration, and in alternate embodiments, ad server 142 may be implemented using components and configurations in addition to, or instead of, certain of those components and configurations discussed in conjunction with the FIG. 7 embodiment.

In the FIG. 7 embodiment, CPU 714 may be implemented to include any appropriate and compatible microprocessor device that preferably executes software instructions to thereby control and manage the operation of ad server 142. The FIG. 7 display 738 may include any effective type of display technology including a cathode-ray-tube monitor or a liquid-crystal display device with an appropriate screen for displaying various information to a device user. In the FIG. 7 embodiment, I/O interface(s) 740 may include one or more input and/or output interfaces to receive and/or transmit any required types of information by ad server 142.

In the FIG. 7 embodiment, memory 718 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 7 embodiment, memory 718 includes, but is not limited to, a server application 722, a transmission module 726, ads 730, and miscellaneous information 734.

In the FIG. 7 embodiment, server application 722 may include program instructions that are preferably executed by CPU 714 to perform various functions and operations for ad server 142. The particular nature and functionality of server application 722 typically varies depending upon factors such as the specific type and particular functionality of the corresponding ad server 142.

In the FIG. 7 embodiment, ads 730 include advertising information that is provided to ad server 142 from advertiser workstations 134 of winning advertisers of the bidding procedure discussed above in conjunction with FIG. 6. In the FIG. 7 embodiment, ad server 142 utilizes transmission module 726 to automatically push/transmit ads 730 to specific targeted user devices 122 by utilizing any effective transmission techniques. For example, in certain embodiments, ad server 142 may transmit ads 730 to user devices 122 via a distributed computer network like the Internet. In the FIG. 7 embodiment, miscellaneous information 734 may include any additional information or data required by ad server 142.

Additional details for the utilization of ad server 142 are further discussed below in conjunction with FIGS. 9A-9D.

Figure 8:
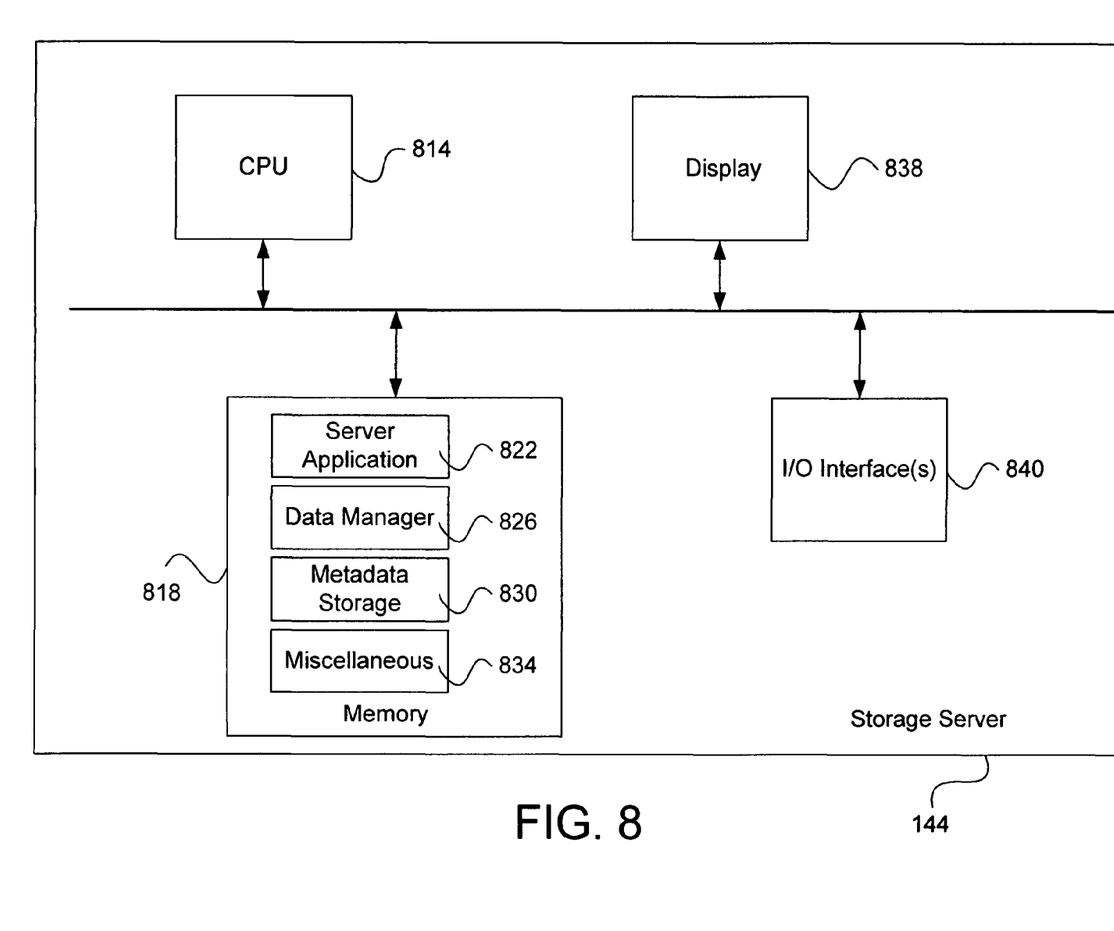
FIG. 8 is a block diagram for one embodiment of the storage server from FIG. 1, in accordance with the present invention.

Referring now to FIG. 8, a block diagram for one embodiment of the FIG. 1 storage server 144 is shown, in accordance with the present invention. In the FIG. 8 embodiment, storage server 144 includes, but is not limited to, a central processing unit (CPU) 814, a memory 818, a display 838, and one or more input/output interface(s) (I/O interface(s)) 840. The FIG. 8 embodiment is presented for purposes of illustration, and in alternate embodiments, storage server 144 may be implemented using components and configurations in addition to, or instead of, certain of those components and configurations discussed in conjunction with the FIG. 8 embodiment.

In the FIG. 8 embodiment, CPU 814 may be implemented to include any appropriate and compatible microprocessor device that preferably executes software instructions to thereby control and manage the operation of storage server 144. The FIG. 8 display 838 may include any effective type of display technology including a cathode-ray-tube monitor or a liquid-crystal display device with an appropriate screen for displaying various information to a device user. In the FIG. 8 embodiment, I/O interface(s) 840 may include one or more input and/or output interfaces to receive and/or transmit any required types of information by storage server 144.

In the FIG. 8 embodiment, memory 818 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 8 embodiment, memory 818 includes, but is not limited to, a server application 822, a data manager 826, metadata storage 830, and miscellaneous information 834.

In the FIG. 8 embodiment, server application 822 may include program instructions that are preferably executed by CPU 814 to perform various functions and operations for storage server 144. The particular nature and functionality of server application 822 typically varies depending upon factors such as the specific type and particular functionality of the corresponding storage server 144.

In the FIG. 8 embodiment, metadata storage 830 includes various types of metadata information that is provided to storage server 144 from any appropriate source. Because of the potential volume of such metadata, storage server 144 functions as a dedicated device for storing and handling the metadata. In the FIG. 8 embodiment, data manager 826 coordinate operations to store, retrieve, and otherwise handle the metadata. In the FIG. 8 embodiment, metadata storage 830 may store any type of appropriate information, including, but not limited to, user metadata, advertiser metadata, metadata files, and bid metadata. In the FIG. 8 embodiment, miscellaneous information 834 may include any additional information or data required by storage server 144. Additional details for the utilization of storage server 144 are further discussed below in conjunction with FIGS. 9A-9D.

Referring now to FIGS. 9A-D, a flowchart of method steps for performing a distribution procedure is shown, in accordance with one embodiment of the present invention. The FIG. 9 flowchart is presented for purposes of illustration, and in alternate embodiments, the present invention may utilize steps and sequences other than those steps and sequences discussed in conjunction with the FIG. 9 embodiment.

Figure 9A:
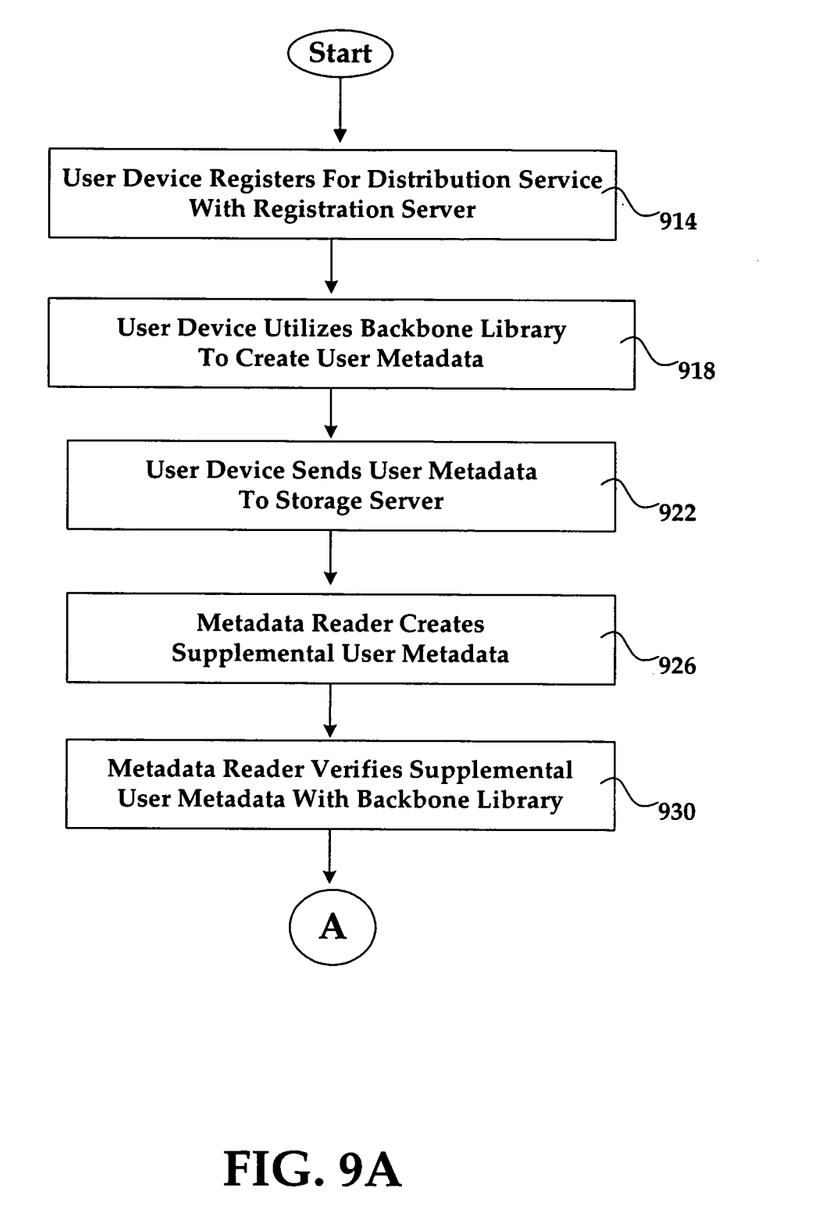
FIGS. 9A-D are a flowchart of method steps for performing a distribution procedure, in accordance with one embodiment of the present invention.

In step 914 of FIG. 9A, a user device 122 initially performs a registration procedure with a registration server 126 to subscribe to distribution services from a distribution system 114 (FIG. 1). In step 918, the user device 122 utilizes a backbone library 334 to create user metadata 230 relating to a device user of user device 122. In step 922, the user device 122 sends the user metadata 230 to a storage server 144 that provides a centralized storage location for large amounts of electronic information.

In step 926, a metadata reader 422 of a metadata server 130 may periodically create supplemental user metadata by utilizing any effective techniques. In step 930, metadata reader 930 verifies the supplemental user metadata with backbone library 334. Metadata reader 930 may then update the user metadata 230 with the verified supplemental user metadata to produce updated user metadata 230. The FIG. 9A flowchart then advances to step 934 of FIG. 9B via connecting letter "A."

Figure 9B:
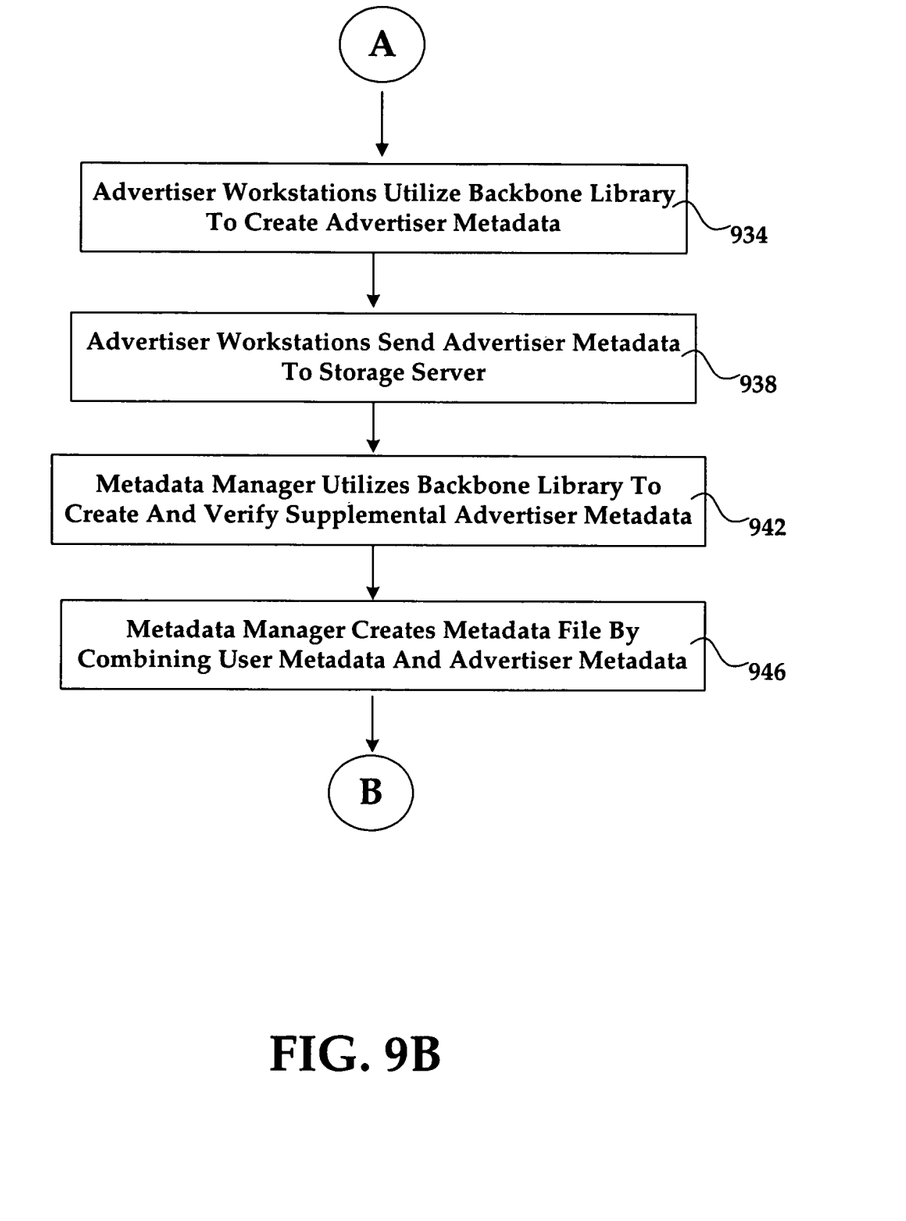

In step 934, advertiser workstations 134 of the distribution system 114 utilize the backbone library 334 to create advertiser metadata relating to respective advertisers of advertiser workstations 134. In step 938, the advertiser workstations 134 send the advertiser metadata to the storage server 144 for temporary storage. In step 942, a metadata manager 426 of the metadata server 130 may periodically create supplemental advertiser metadata by utilizing any effective techniques. Metadata reader 930 also verifies the supplemental advertiser metadata with backbone library 334.

Metadata manager 426 may then update the previously-created advertiser metadata with the verified supplemental advertiser metadata to produce updated advertiser metadata. In step 946, metadata manager 426 then creates a metadata file 430 by combining information from the user metadata and the advertiser metadata that are located on storage server 144. The FIG. 9B flowchart then advances to step 954 of FIG. 9C via connecting letter "B."

Figure 9C:
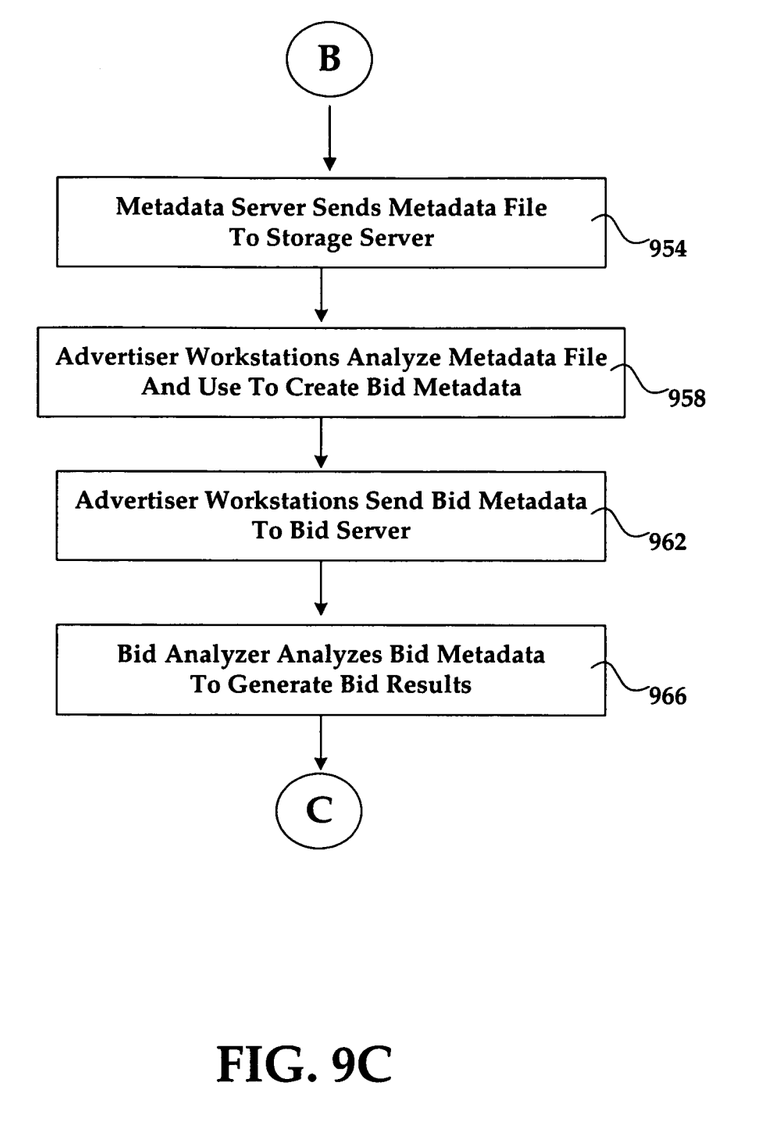

In step 954, metadata manager 426 stores the metadata file 430 created in foregoing step 946 onto storage server 144. In step 958, bid managers 526 of the advertiser workstations 134 access and analyze the metadata file 430 stored on storage server 144. The bid managers 526 then utilize the metadata file 430 to create corresponding bid metadata 630 that reflects respective advertising bids to distribute appropriate advertisements to the targeted user device 122 via distribution system 114.

In step 962, the advertiser workstations 134 send the bid metadata 630 to a bid server 138 of the distribution system 114. In step 966, a bid analyzer 626 of the bid server 138 performs a bid analysis procedure upon the received bid metadata 630 to generate corresponding bid results 634 that include one or more winning advertisers who have been awarded the right to transmit/push their advertisements to the targeted user device 122. The FIG. 9C flowchart then advances to step 970 of FIG. 9D via connecting letter "C."

Figure 9D:
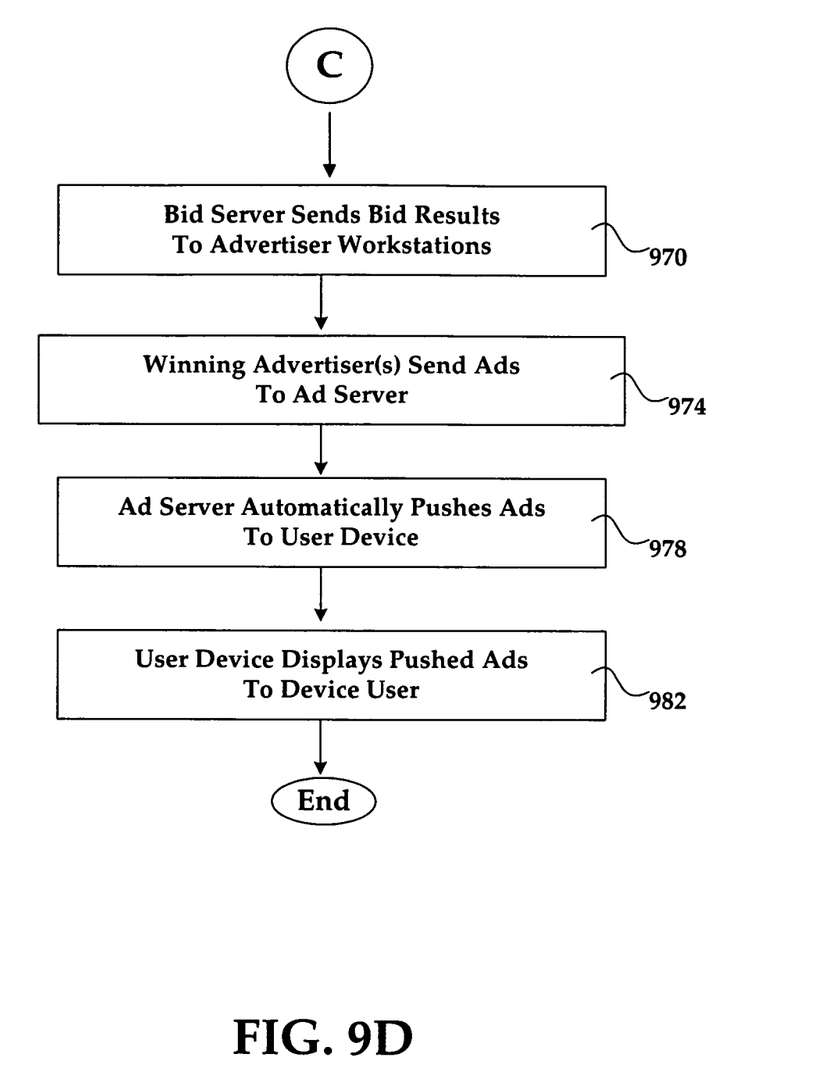

In step 970, the bid server 138 sends the bid results 634 to the advertiser workstations 134. In response, in step 974, the winning advertiser(s) send their ads 534 to an ad server 142 of the distribution system 114. In step 978, the ad server 142 automatically transmits (pushes) the ads 534 to the targeted user device 122. Finally, in step 982, the user device 122 may display the pushed ads to a device user. The FIG. 9 process may then terminate.

For purposes of illustration, the FIG. 9 example is presented in the context of a single user device 122. However, in alternate embodiments, any desired number of additional user devices 122 are equally contemplated. Furthermore, the present invention is disclosed as transmitting advertising information. In alternate embodiments, any other type of electronic information may similarly be transmitted by itself, or in combination with advertising information. For example, in certain embodiments, various type of electronic content (e.g., audio/video information) may be bundled together with the advertising information. For at least the foregoing reasons, the present invention therefore provides an improved system and method for effectively performing a distribution procedure using an electronic backbone.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting an information distribution procedure, comprising:
   a user device that performs a registration procedure for receiving distribution services from a distribution system, said user device also generating user metadata regarding a device user of said user device;
   workstations associated with respective advertisers, said workstations analyzing said user metadata to produce corresponding bid metadata that includes competing bid amounts from said respective advertisers for payment to a distribution system owner;
   a bid server that evaluates said bid metadata to determine one or more winning workstations from among said workstations then automatically transmitting advertising information to said user device, said advertising information being specifically targeted towards said device user by analyzing said user metadata.

2. The system of claim 1 wherein said distribution system utilizes a push technique to automatically select and transmit only said advertising information that is relevant to said device user in light of personal profile details provided in said user metadata.

3. The system of claim 1 wherein said registration procedure includes said device user entering into a formal agreement to allow said distribution system to access and utilize personal information regarding said device user, said formal agreement specifically defining what level of said personal information may be utilized by said distribution system.

4. The system of claim 1 wherein said user device utilizes a backbone library to verify that said user metadata confirms to predefined rules.

5. The system of claim 4 wherein said predefined rules include format rules and nomenclature rules that are supported by said distribution system for said user metadata.

6. The system of claim 1 wherein said user metadata includes a personal name, gender, age, religion, hobbies, interests, occupation, marital status, residence, income, Internet browsing history, and credit-card transaction records.

7. The system of claim 1 wherein said user device stores said user metadata on a storage server coupled to said distribution system.

8. The system of claim 1 wherein a metadata server periodically updates said user metadata with supplemental user metadata that is verified with a backbone library.

9. The system of claim 1 wherein workstations generate advertiser metadata regarding said respective advertisers, said workstations verifying said advertiser metadata with a backbone library.

10. The system of claim 9 wherein a metadata server combines said user metadata and said advertiser metadata to produce metadata files, said workstations analyzing said metadata files to generate said bid metadata.

11. The system of claim 1 wherein said bid server evaluates said bid metadata according to predefined evaluation criteria that include a relevance of said advertising information to said device user, and an advertiser bid amount.

12. The system of claim 1 wherein the winning workstations send said advertising information to an ad server that automatically transmits said advertising information to said user device.

13. The system of claim 12 wherein said user device displays said advertising information to said device user, said information distribution procedure automatically providing said advertising information in a targeted manner without affirmative requests from said device user.

14. The system of claim 1 wherein said distribution system is implemented and supported by a distribution control entity that offers access to said distribution services to both said respective advertisers and said device user in return for financial or other compensation, said distribution entity being a commercial enterprise that maintains and controls key elements of said distribution system.

15. The system of claim 1 wherein said distribution system further comprises a registration server, a metadata server, a storage server, and an ad server.

16. The system of claim 1 wherein said distribution system further comprises a registration server, a backbone library, a metadata server, a storage server, and an ad server that communicate through an electronic backbone.

\* \* \* \* \*